United States Patent

[11] 3,566,083

[72] Inventor John V. McMillin
Iowa City, Iowa
[21] Appl. No. 675,670
[22] Filed Oct. 16, 1967
[45] Patented Feb. 23, 1971
[73] Assignee Measurement Research Center, Inc.
Iowa City, Iowa

[54] SENSOR FOR PUNCHES AND MARKS

5 Claims, 6 Drawing Figs.

[52] U.S. Cl. .......... 235/61.11, 250/227, 350/96
[51] Int. Cl. .......... G02b 5/14, G02b 5/16, G06k 7/10
[50] Field of Search .......... 235/61.11, 61.115; 250/219 (ID), 219 (IDC), 227; 350/96, (Inquired)

[56] References Cited

UNITED STATES PATENTS 3,327,584 9/1963 Kissinger .......... 350/96X

OTHER REFERENCES

IBM TECHNICAL DISCLOSURE BULLETINS: 1.) Seesing, " Card Reader," Vol. 5, No. 12, May 1963, p. 75 2.) Rohland, " Sensing Apparatus," Vol. 7, No. 6, Nov. 1964, p. 476 & 477 3.) Sokolski, " Fiber Optic Read Head," Vol. 8, No. 6, Nov. 1965, p. 879 & 880

*Primary Examiner*—Maynard R. Wilbur
*Assistant Examiner*—Thomas J. Sloyan
*Attorney*—Beveridge and DeGrandi

ABSTRACT: An apparatus for optically reading data cards bearing both standard perforations and marks. In the preferred embodiment, a plurality of bifurcated optical fiber bundles are arranged to scan the card to be read column by column. Each bundle is arranged in the form of a Y. Light is directed into one branch of the Y and a light sensitive element is connected to the other branch. Light is reflected into the second branch from the first as the card is being read. The amount of light reflected is determined by whether a perforation or a mark is detected and by the density or blackness of the mark.

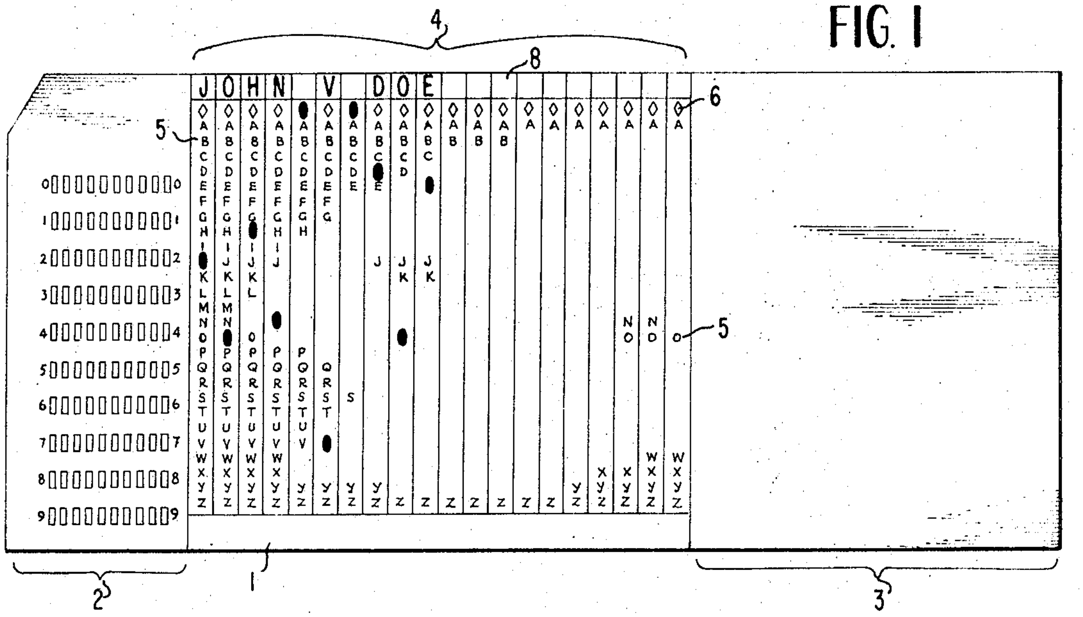
FIG. I
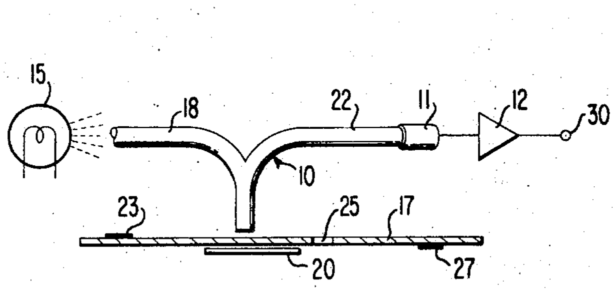
FIG. 2
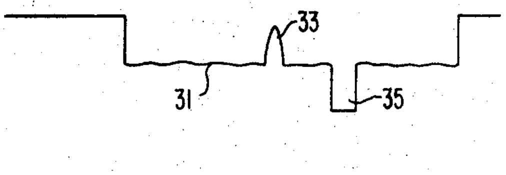
FIG 3
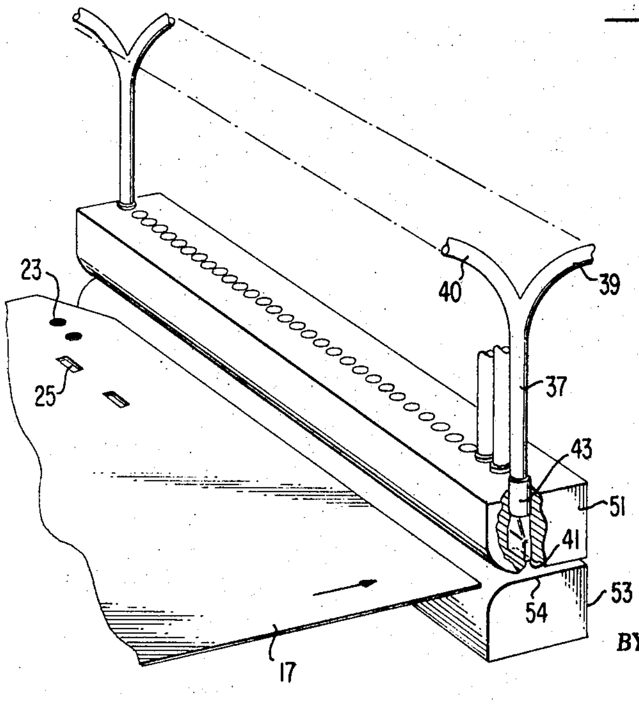
FIG. 5
INVENTOR
JOHN V. McMILLIN
BY Browne, Schuyler & Beveridge
ATTORNEYS INVENTOR
JOHN V. McMILLIN BY Browne, Schuyler & Beveridge
ATTORNEYS

SENSOR FOR PUNCHES AND MARKS

This invention relates to devices for reading data cards, sometimes called IBM cards or Hollerith cards, and more particularly to optical devices for sensing perforations and pencil marks on such cards.

Conventional data cards are convenient documents to use in applications wherein data is entered onto the cards by means of filling in response areas with an ordinary pencil. Such applications may be seen, for example, in the educational field, such as student enrollment cards or cards used by students to encode examination answers.

Data cards are normally punched with a 12 position code known as the Hollerith Code. Unfortunately, restriction to the use of only 12 perforation locations in a card column limits normal use of such cards to numeric coding or simple item response coding. (Such as two 6-choice items, for example).

Respondents cannot be expected to refer to a complex Hollerith Conversion Chart each time entry of an alphanumeric symbol is desired. The simplest solution to this problem is to increase the number of marking locations in each column to 26 to accommodate alphabetic symbols. However, some applications may require standard perforations in certain card columns or fields. Accordingly, for many applications, cards are produced which may contain both standard perforations and pencil marks. Card processing efficiency is greatly enhanced if one machine can handle either normally perforated cards, pencil-marked cards or cards containing both of these types of data.

One standard approach to the problem of having one machine accept both types of data is to utilize a dual scanning head containing one row of 12 sensing elements for perforation reading and a second nearby row of 26 sensing elements for mark reading. Including the four extra channels required for such functions as registration detection, a total of 42 channels of scan amplifiers would be required. Moreover, since the dual scan heads would be offset, a further design complexity of timing synchronization would be introduced.

A simpler and more efficient system would result if a single row of 30 sensing elements could read the 12 perforation positions as well as the 26 alphabetic positions. The invention disclosed and claimed herein achieves this result.

This invention consists of an optical sensor for reading normal card perforations as well as pencil marks on a standard data card. A single row of 30 sensing elements is provided, each sensing element comprising a bifurcated optical fiber bundle.

Sensing devices made according to this invention may be used with any system which accepts optical scanning impulses. Pat. No. 3,050,248 to Lindquist and application Ser. No. 540,700, filed Apr. 6, 1966, both assigned to the assignee herein, disclose inventions which are operable in response to impulses generated by the sensing elements of this invention.

It is therefore an object of this invention to provide means for sensing standard perforations in data cards.

It is another object of this invention to provide means for sensing pencil marks on data cards.

It is a still further object of this invention to provide means for optically sensing both perforations and pencil marks distributed across the same data card.

It is still another object of this invention to provide means for sensing both standard perforations and pencil marks on a data card using the least possible number of sensing channels.

It is a still further object of this invention to provide means for sensing both standard perforations and pencil marks on a data card with a sensor having sensing means arranged in a single row across the feed path of said card.

It is still another object of this invention to provide a new and improved method for making a sensing unit according to the present invention.

These and other objects will become readily apparent from a reading of this specification and an examination of the attached drawings, wherein:

FIG. 1 illustrates a data card of the type which may be read by this invention;

FIG. 2 is a diagram showing a side view of portions of one of the sensing elements of this invention;

FIG. 3 illustrates the voltage waveform generated by the sensing element of FIG. 2;

FIG. 5 is a partial view of the complete sensing unit according to this invention.

Figure 4:
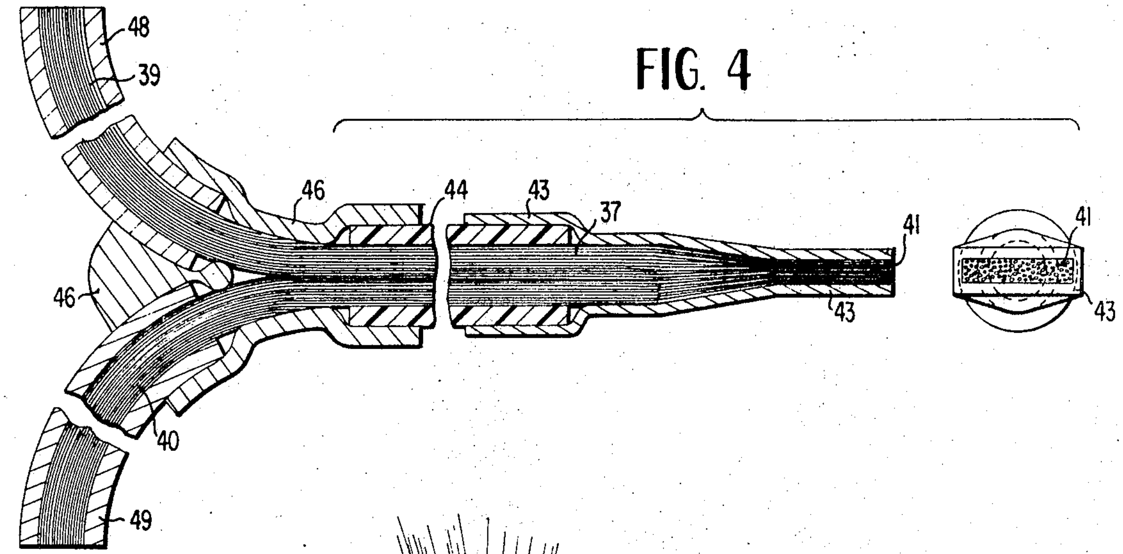
FIG. 4 is a detailed view of a single sensing unit according to this invention.

Referring to FIG. 1 a data card of the type which may be read by this invention is shown having two fields 2, 3 for normal key punch perforation and a third field 4 for alphabetic pencil marking. Contrary to the usual practice of reading a data card from bottom to top, the sensing elements of this invention scan the data card in a sideways direction. In this manner, the card is read a single column at a time.

Field 4 of card 1 is printed with 26 alphabetic positions in each column, such as 5, and one position 6 indicating a blank column. Horizontal space 8 at the top of the card provides positions for entry of the alphabetic symbols to be marked on the card. In the example card shown in FIG. 1, a respondent has entered the name "John V Doe" in space 8. The respondent then overmarks corresponding letters in each column beneath the letters in the name with a pencil. In addition, blank column position 6 is marked before and after the middle initial in the name. This causes any stray smudges in these column scan areas to be suppressed because of the darker blank column or cancellation mark. Consequently, more reliable reading results.

It is pointed out that the card layout shown in FIG. 1 is for purposes of example only. The sensing devices of this invention are capable of sensing any sequence of perforated and marked columns.

As explained previously, the most desirable sensor is a single row of sensing elements with the minimum number of channels. Since 26 sensing elements are needed for sensing all of the alphabetic symbols and an additional four sensing elements are required for purposes hereinafter described, the most efficient sensor would have 30 elements, arranged in a single row. Approximately 0.15 inch of the card width should be left for registration detection devices and other requirements described herein. Thus, the maximum center to center spacing of the sensing elements may not exceed the card width minus the reserved space of 0.15 inch divided by the number of sensing elements. Since there are 30 sensing elements and the card width is 3.25 inches, the greatest center-to-center sensing element spacing is 0.103 inch.

The smallest center to center sensing element spacing that could be used has no definite lower limit, except that the task of carefully marking a smaller and smaller area without overmarking an adjacent area becomes more difficult. Machine registration tolerances, document-image printing tolerances, document size stability, etc., also come into play more prominently as the center to center sensing element spacing is reduced. Considering these factors, and considering the need for a maximum of only thirty responses in a data column, it appears that center to center spacings below 0.097 inch would serve no practical purposes. Therefore an upper limit of 0.103 inch center-to-center spacing of the sensing elements has been determined by the card document width and the number of data spaces required across that width. The lower limit has been set at 0.097 inch as a matter of judgment considering the factors mentioned in the earlier part of this paragraph.

Since the center-to-center spacing of the marks in the alphabetic columns and the spacing of the perforations in the standard columns are different, sensing elements positioned to coincide with the marks in the alphabetic columns will not correspond exactly to the positions of the 12 possible perforations in the standard perforated columns. That is, a sensing element designated to sense a certain marked position would possibly be offset from its assigned perforated position. The greatest offset of a sensing element from its assigned perforation position is a function of both center-to-center sensing element spacing and the distance from the centerline of the uppermost sensing element to the centerline of the uppermost perforation position. It was found that the smallest offsets, and therefore the most desirable configuration, is obtained with a sensing element center-to-center spacing of 0.100 inch with the center of the uppermost sensing element at a distance of 0.025 inch above the centerline of the uppermost punch position. The punched hole or perforation is rectangular in shape, having the dimensions of 0.125 inch by 0.055 inch.

With the foregoing configuration, each alphabetic position is read by a corresponding sensing element. Perforation positions and sensing elements assigned to read them are matched according to a table to be discussed hereinafter. Pulses generated by sensing elements not assigned to a perforation position indicate pencil marks at a corresponding alphabetic column position. As will be discussed herein in connection with FIGS. 2 and 3, pulses generated by sensing of perforations and marks by the sensing elements may be easily discriminated.

A number of different methods may be used to optically sense both card perforations and card marks. By placing a light source beneath the card, light may be directed through the card upon a photosensitive sensing element. A perforation in the card greatly increases the light falling upon the sensing element whereas a mark decreases the light, both with reference to a base level established by the amount of light shining through a blank card containing neither marks nor punches. Accordingly, a desirable bipolar signal is generated, enabling the system to differentiate between a mark and a perforation. However, this mode of reading is incapable of distinguishing between a frontside card mark and a backside card mark. In each case, the light reaching the sensing element will be considerably diminished, causing an approximately equal signal to be generated. Since some applications may require a respondent to mark both the front and back sides of a card, this reading mode is undesirable.

By using a reflecting reading mode, the card may be examined on each side for pencil marks since the scanning light beam is restricted to the side of the card being scanned. In general, the reflecting mode of scanning is more desirable because less document "noise" is encountered. This is because card stocks are generally more constant in reflectance than in thickness and homogeneity.

One embodiment of reflectance mode reading incorporates a dark void on the side of the card opposite a light source. In this embodiment, the signal generated by a perforation is of the same polarity as that generated by a pencil mark. This is undesirable since a predetermined card format or program control would have to be used to determine whether a mark or perforation existed at any given data location. Moreover, an open void could become a source of card jams and misfeeds. If a flat surface were simply darkened, repeated card feedings would soon polish it to an unacceptable gloss.

The preferred embodiment of this invention is shown in FIG. 2. The sensing element consists of a bifurcated optical coated fiber bundle 10, to be discussed in detail in connection with the FIG. 4, shaped in the form of a Y. One branch is mechanically connected to light sensitive device 11. Outputs of light sensitive device 11 are connected to utilization devices through amplifier 12. A light source 15 is positioned to direct light into the second branch of bifurcated fiber bundle 10. As will be explained in connection with FIG. 4, light is transmitted toward data card 17 through branch 18 of the fiber bundle. A highly reflective surface 20 is positioned in the card feed throat opposite sensing element 10. Those portions of card 17 having no pencil mark nor perforation reflect a small amount of light to light sensitive element 11 through branch 22 of the bifurcated fiber bundle. When a portion of the card bearing a pencil mark, such as 23, passes beneath the tip of the sensing element, light reflected into branch 22 of the fiber bundle is greatly reduced. This causes a substantial drop in voltage generated by the light sensitive device 11. When a card perforation, such as 25, passes beneath the tip of sensing element 10, light reflected from surface 20 causes a substantial increase in the voltage generated by light sensitive element 11. Accordingly, voltage pulses will be generated by element 11 having a polarity dependent upon whether a front side mark or a perforation has been scanned. This difference in polarity allows discrimination circuits (not shown) to determine whether a pencil mark or a perforation has been detected by the sensing element. A mark on the underside of card 17, such as 27, does not effect the light received by element 11 and does not, therefore generate an output.

The voltage wave form which would be present at output 30 of amplifier 12 (FIG. 2) is illustrated in FIG. 3. Normal card reflectance would cause enough light to be directed at light sensitive element 11 to generate a general voltage level 31. A front side mark on the card would cause a substantial decrease in the amount of light reflected toward element 11 and a corresponding decrease 33 in the voltage generated. A perforation passing beneath the sensing element would expose device 11 to the reflective surface, causing a corresponding increase 35 in the voltage generated.

Referring to FIG. 4, the design of a single bifurcated optical fiber bundle sensing element is shown. The optical portion of the sensing element is comprised of a bundle of individual filaments of coated glass or a clear acrylic plastic having a relatively high index of refraction. The coating has a relatively low index of refraction. Each individual fiber is approximately 0.003 inch in diameter. As is well known, each fiber will transmit light throughout its length irregardless of the shape to which the fiber is bent wherefore such a fiber is sometimes referred to as a "light pipe". Each sensing element contains approximately two hundred such fibers.

The fibers are parted to form a Y-shaped element. Each branch 39, 40 contains fibers distributed across the entire area of tip 41 of the sensing element. Light entering the fiber bundle through one of its branches, 40, for example, is radiated away from tip 41 in a reasonably uniform density across the entire area of the sensing element tip. Likewise, light reflected from any object near the tip of the sensing element will be accepted and directed through the length of branch 39 to a light sensitive element, such as is shown at 11 in FIG. 2.

It has been found that the optimum sensing element tip is rectangularly shaped with dimensions of approximately 0.015 inch by 0.075 inch. This size and shape is obtained by inserting the fiber bundle into a steel termination body 43. A protective flexible sheath 44 connects termination body 43 to molded Y junction 46. Between the light source or light sensitive elements and molded Y junction 46, the fiber bundle branches 39, 40 are held in protective flexible sheaths 48, 49. The termination surface of the optical fibers at both sensing tip 41 and the ends of branches 39, 40 are surface ground and polished flat.

FIG. 5 illustrates the assembly structure of the bifurcated optical sensor according to this invention. In the preferred embodiment, the complete scanning head contains a total of 33 sensing elements. Of this number, 30 are used for data scanning, one for card reflectance monitoring and two for card registration detection. The 33 sensing elements are symmetrically distributed across the 3.25 inch dimension of the data card. With this configuration, sensing element-perforation position pairs are as follows:

| Perforation position: | Sensing element |
|---|---|
| 12 zone | 2 |
| 11 zone | 5 |
| 0 | 7 |
| 1 | 10 |
| 2 | 12 |
| 3 | 15 |
| 4 | 17 |
| 5 | 20 |
| 6 | 22 |
| 7 | 25 |
| 8 | 27 |
| 9 | 30 |

As is shown in FIG. 5, the sensing elements are positioned in block 51 which comprises one-half of the usual card feed throat. The opposite portion 53 of the card feed throat is provided with a highly polished surface 54 to serve as the reflecting background for the sensing element.

To read similar data on both sides of the mark sense card in a single pass through the machine, it is necessary to have an identical set of bifurcated optical fiber sensing units facing the back side of the card. The structure would be similar to that shown in FIG. 5, except that each side of the card throat would be equipped with the sensing elements. To get the necessary space for a reflecting surface, the backside sensing elements must be offset from those opposite.

For redundancy purposes, the appropriate 12 sensors in the backside scanning head could also read any punched holes in the card. The perforation read out, since it is distinguishable from the pencil mark data, could be "bit-compared" between front side and back side data registers for every column and any discrepencies logically indicated.

Figure 6:
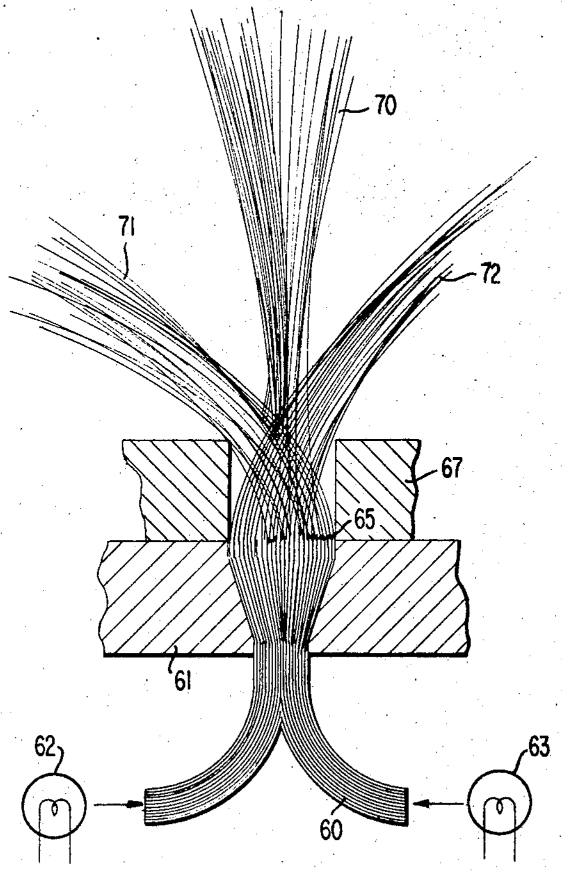
FIG. 6 illustrates the method for forming a single sensing unit according to this invention.

As may be readily appreciated, it is very important for the optical fibers in each of the optical fiber bundles to be uniformly distributed at the base of the Y. It has been found that commercially available bundles, in many cases, were not sufficiently uniform in fiber distribution to operate satisfactorily in this invention. Accordingly, the following procedure was devised. Referring to FIG. 6 a "standard" bifurcated bundle 60 is shown held in locking body 51 in an inverted position. The "standard" bundle is selected from those commercially available having a satisfactorily uniform distribution of fibers from both branches of the Y. A source of red light 62 is directed at one branch of the standard Y and a source of green light 63 is directed at the other. An image of reasonably uniformly distributed red and green dots then appears on face 65 of the standard. A reading head cavity 67 is positioned immediately above the face of the "standard." A plurality of optical fibers is then inserted into the reading head cavity. Most of the randomly oriented and unselected fibers 70 will be conducting primarily red or green light depending on the location of the lower fiber end with respect to the red-green pattern on the face of the "standard."

The assembly-worker looking at the ends of the randomly oriented unselected fibers, merely moves the "red" fibers to one side 71 and the "green" fibers to the other 72. In this fashion, a bifurcated optical bundle is produced with a distribution of fibers essentially matching that of the "standard."

It should be pointed out, that the "standard" is not necessarily an optical fiber bundle. It could be, for example, a film color transparency having the proper distribution of colored dots.

As may readily be appreciated by those skilled in the art, changes may be made in the structures disclosed herein without departing from the spirit of this invention. It is intended that this invention be limited only by the appended claims.

I claim:

1. In an apparatus for sensing perforations, marks and both perforations and marks on a data card, the combination comprising:

a plurality of aligned sensing elements, each of said elements having a light input portion, a light output portion, and a portion common to both, wherein;

each of said sensing elements is comprised of a bundle of optical fibers, bifurcated into two branches at a location intermediate of said bundles, said bundles ends and having fibers from both branches intermixed and uniformly distributed throughout said common portion; and light reflecting means positioned adjacent said common portion, each light input portion being capable of transmitting light to said reflecting means, and said reflecting means being operative to reflect such transmitted light to said light output portions of said sensing elements for transmission thereby, the intensity of light transmitted by said output portion depending upon whether a perforation or a mark is being sent.

2. An apparatus according to claim 1 including light sensitive means operatively associated with each of said light output portions for generating an electrical signal proportional to the light transmitted to it by said output portion.

3. The combination of claim 2 wherein said sensing elements are arranged in a side-by-side relationship with the ends of the common portions being colinearly disposed.

4. The combination of claim 3 wherein the ends of the common portions of said bundles are rectangularly shaped, having dimensions of approximately 0.015 inch by 0.075 inch.

5. An apparatus according to claim 4 wherein said common portion ends are positioned with a center-to-center spacing of 0.097 inch.